(12) United States Patent
Phinisee et al.

(10) Patent No.: US 12,140,705 B2
(45) Date of Patent: Nov. 12, 2024

(54) ROTATING SENSOR ASSEMBLY

(71) Applicant: Ford Global Technologies, LLC, Dearborn, MI (US)

(72) Inventors: Rashaun Phinisee, Ypsilanti, MI (US); Raghuraman Surineedi, Dearborn, MI (US); Venkatesh Krishnan, Canton, MI (US); Michael Robertson, Jr., Garden City, MI (US); Tyler D. Hamilton, Farmington, MI (US); Segundo Baldovino, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 940 days.

(21) Appl. No.: 17/178,381

(22) Filed: Feb. 18, 2021

(65) Prior Publication Data

US 2022/0196807 A1    Jun. 23, 2022

Related U.S. Application Data

(60) Provisional application No. 63/127,446, filed on Dec. 18, 2020.

(51) Int. Cl.
*G01S 7/48* (2006.01)
*G01S 7/481* (2006.01)
*G01S 17/931* (2020.01)

(52) U.S. Cl.
CPC .......... *G01S 7/4817* (2013.01); *G01S 17/931* (2020.01)

(58) Field of Classification Search
USPC ........................................................ 356/4.01
See application file for complete search history.

(56) References Cited

U.S. PATENT DOCUMENTS

| | | | |
|---|---|---|---|
| 8,767,190 B2 | 7/2014 | Hall | |
| 9,970,643 B2 | 5/2018 | Adema et al. | |
| 10,189,450 B2 | 1/2019 | Rice | |
| 10,442,402 B2 * | 10/2019 | Schmidt | B60S 1/52 |
| 10,448,264 B2 | 10/2019 | Elson et al. | |
| 10,782,520 B2 * | 9/2020 | Crespo | B60S 1/566 |
| 11,480,451 B2 * | 10/2022 | Ellgas | G01D 11/24 |
| 11,643,023 B2 * | 5/2023 | Sandberg | B60S 1/566 15/250.001 |
| 2010/0026158 A1 * | 2/2010 | Wu | F21V 29/773 362/373 |
| 2011/0216304 A1 * | 9/2011 | Hall | G01S 17/89 356/4.01 |
| 2012/0002415 A1 * | 1/2012 | Nelson | F21V 29/76 362/235 |
| 2015/0184895 A1 * | 7/2015 | Shelef | F24S 40/20 134/99.1 |
| 2016/0138417 A1 * | 5/2016 | Seroka | F01D 5/02 415/118 |
| 2016/0380350 A1 * | 12/2016 | Elson | H04W 88/04 248/274.1 |

(Continued)

*Primary Examiner* — James R Hulka
(74) *Attorney, Agent, or Firm* — Frank A. MacKenzie; Bejin Bieneman PLC

(57) ABSTRACT

A sensor assembly includes a base and a sensor housing mounted to the base. The sensor housing is rotatable relative to the base about an axis. The sensor housing includes a top panel having an exterior surface. A plurality of fins are disposed on the exterior surface and are fixed relative to the sensor housing. The fins extend radially outward relative to the axis.

20 Claims, 7 Drawing Sheets

(56) References Cited

U.S. PATENT DOCUMENTS

| | | | |
|---|---|---|---|
| 2017/0307204 A1* | 10/2017 | Cattoni | F21V 29/89 |
| 2017/0328549 A1* | 11/2017 | Adema | G03B 21/16 |
| 2017/0367550 A1* | 12/2017 | Shiozawa | F04D 29/5806 |
| 2018/0015907 A1* | 1/2018 | Rice | B60S 1/52 |
| 2018/0156439 A1* | 6/2018 | Treible, Jr. | F21V 29/74 |
| 2018/0244245 A1 | 8/2018 | Schmidt et al. | |
| 2018/0299114 A1* | 10/2018 | Inan | F21V 29/77 |
| 2019/0273421 A1* | 9/2019 | Velderman | H02K 5/18 |
| 2020/0033592 A1 | 1/2020 | Crespo et al. | |
| 2020/0164813 A1 | 5/2020 | Sandberg | |
| 2020/0191614 A1 | 6/2020 | Ellgas et al. | |

\* cited by examiner

ROTATING SENSOR ASSEMBLY

CROSS-REFERENCE TO RELATED APPLICATIONS

This patent application claims priority to and all advantages of U.S. Provisional Patent Application No. 63/127,446 titled "ROTATING SENSOR ASSEMBLY", filed Dec. 18, 2020.

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

Figure 1:
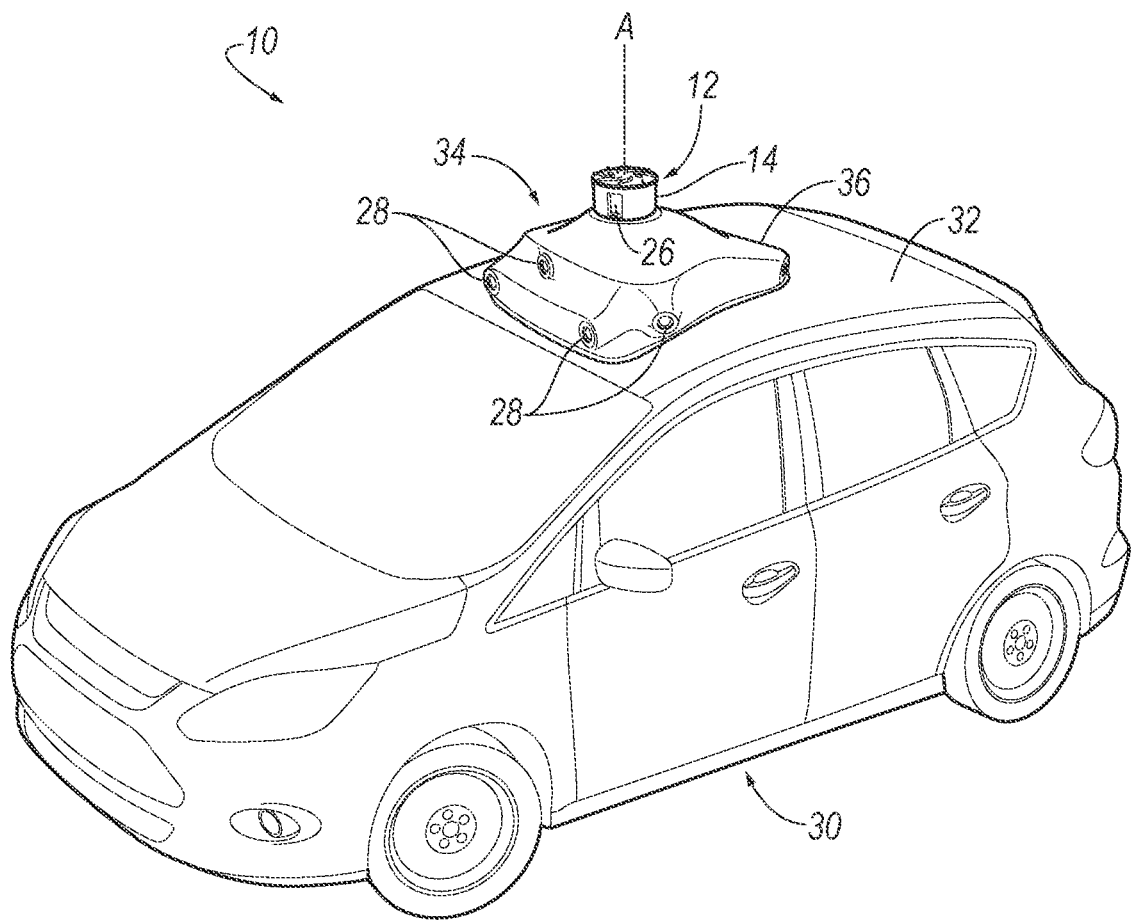
FIG. 1 is a perspective view of an example vehicle.
Figure 2:
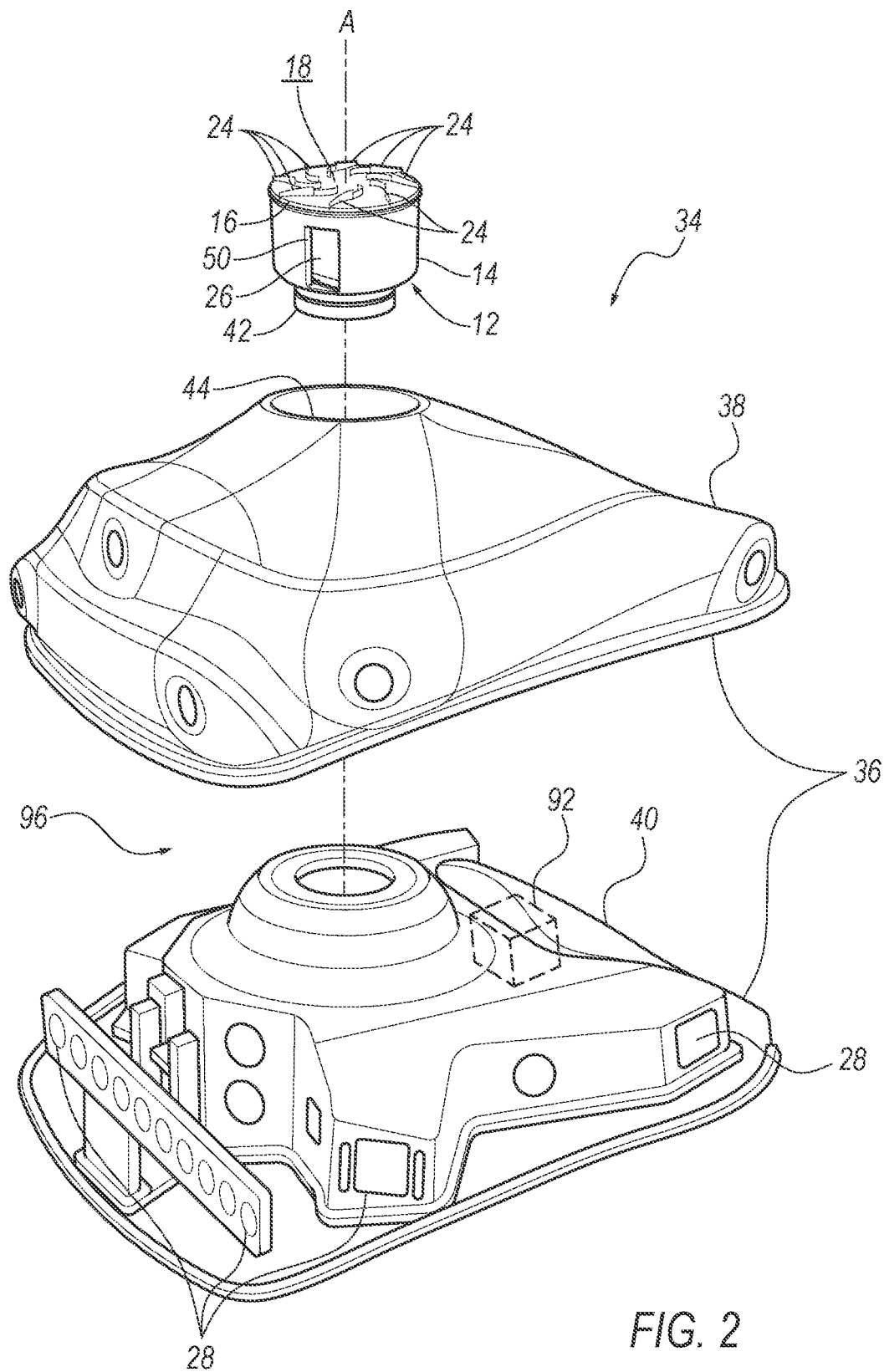
FIG. 2 is an exploded perspective view of a sensor apparatus of the vehicle.
Figure 3:
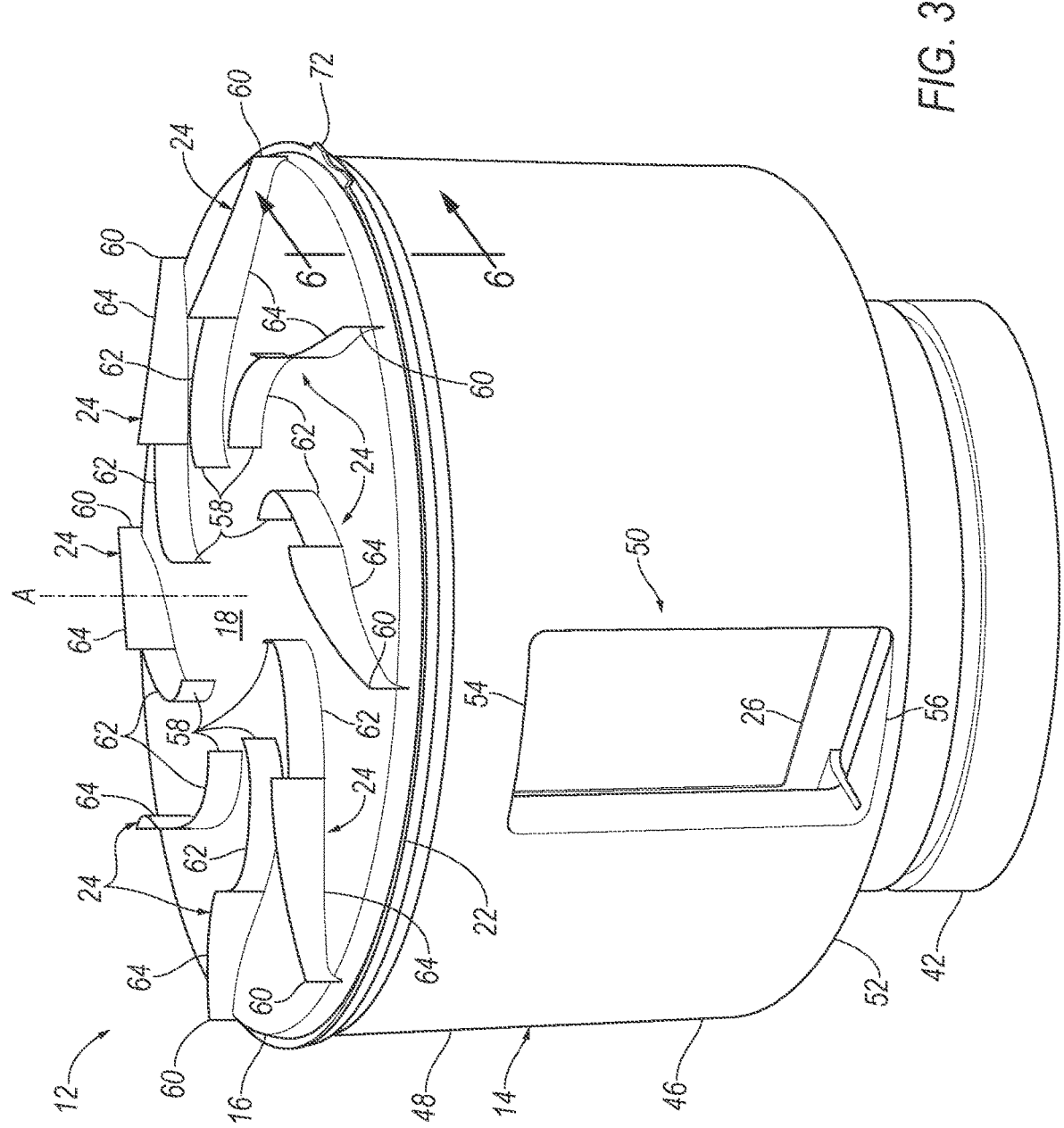
FIG. 3 is a perspective view of an example a sensor assembly including a sensor housing having a plurality of fins disposed on an exterior surface of a top panel of the sensor housing.
Figure 4:
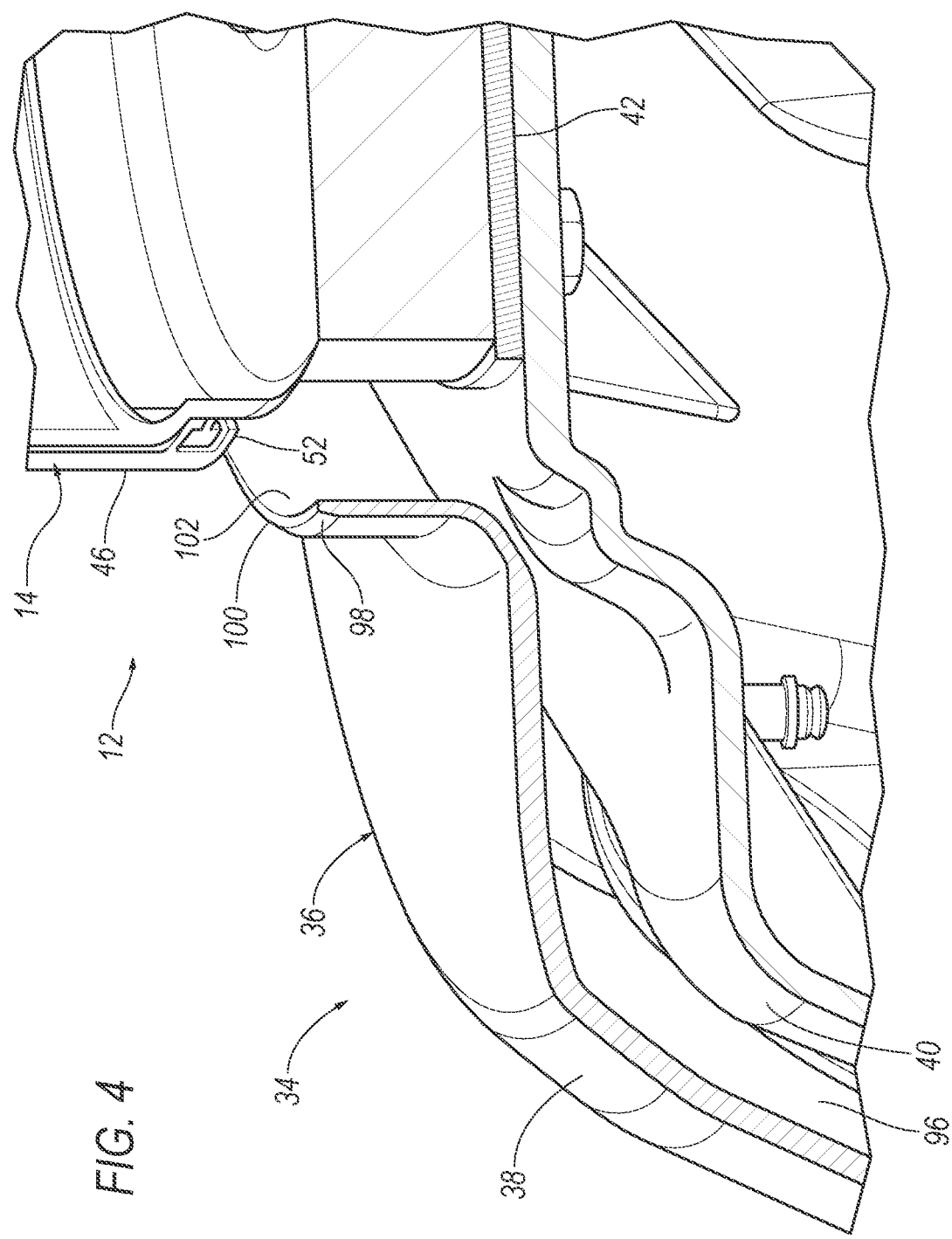
FIG. 4 is a cross-sectional perspective view of a portion of the sensor apparatus.
Figure 5:
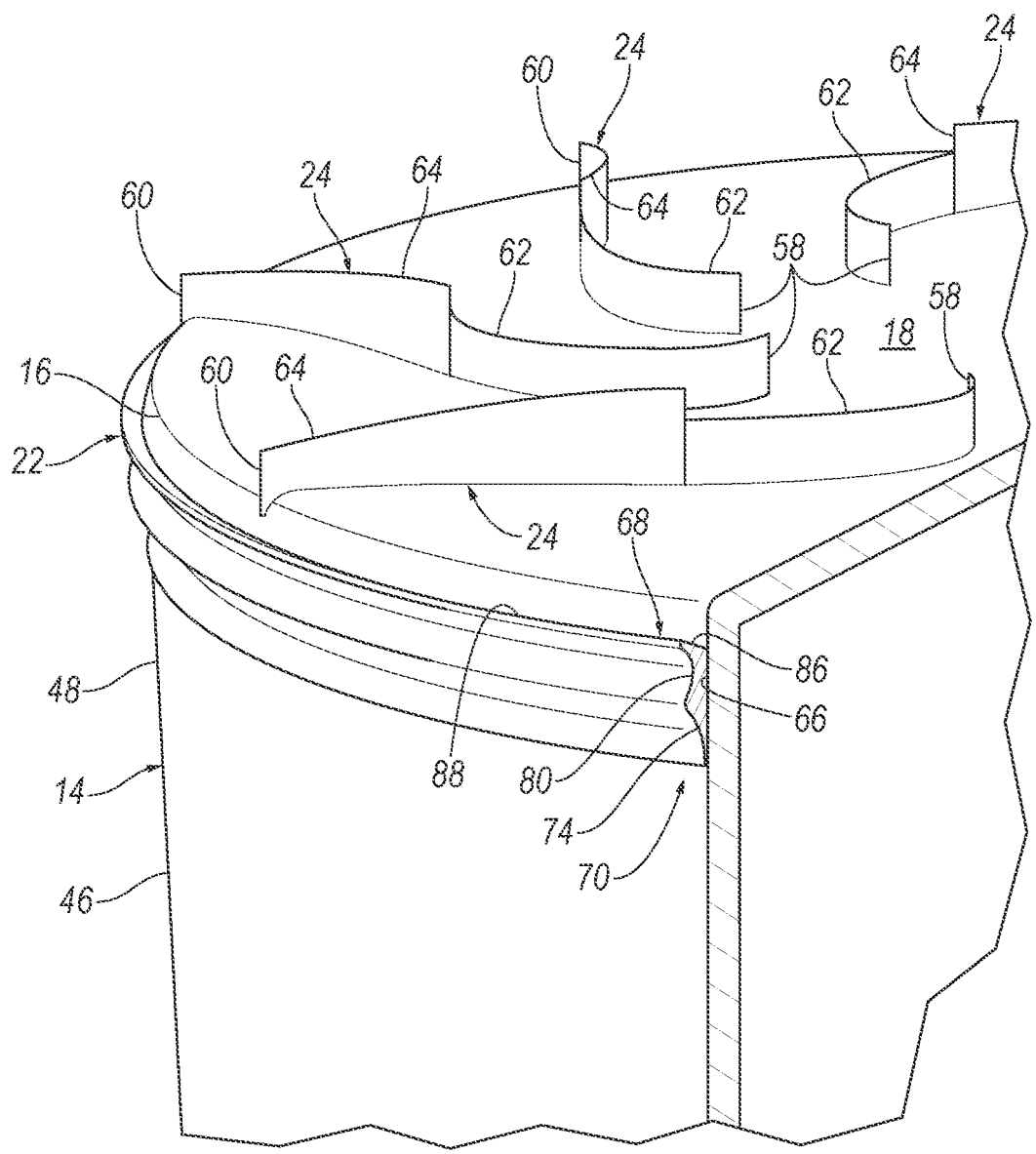
FIG. 5 is a cross-sectional perspective view of the sensor housing including a gutter fixed to the sensor housing.
Figure 6:
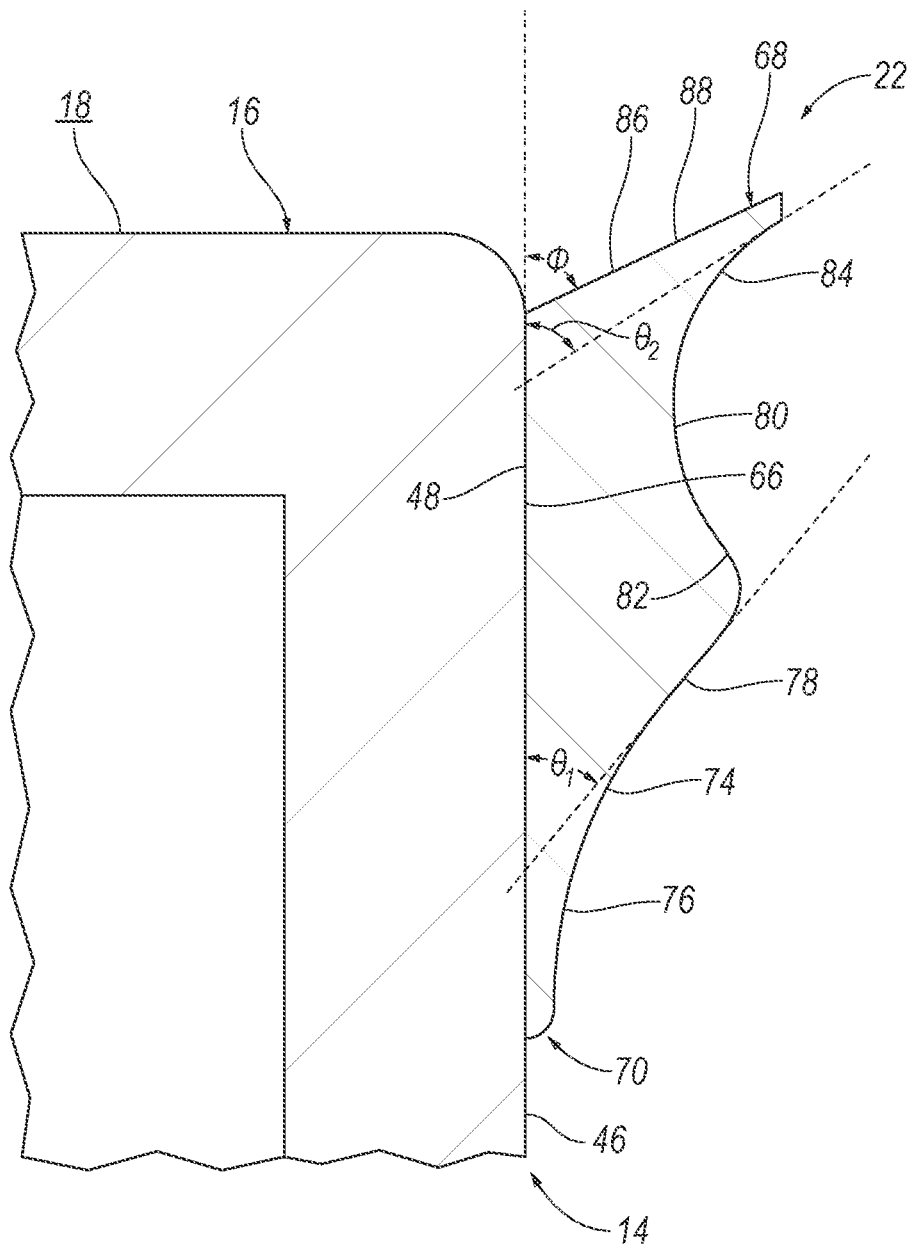
FIG. 6 is a cross-sectional view of the gutter.
Figure 7:
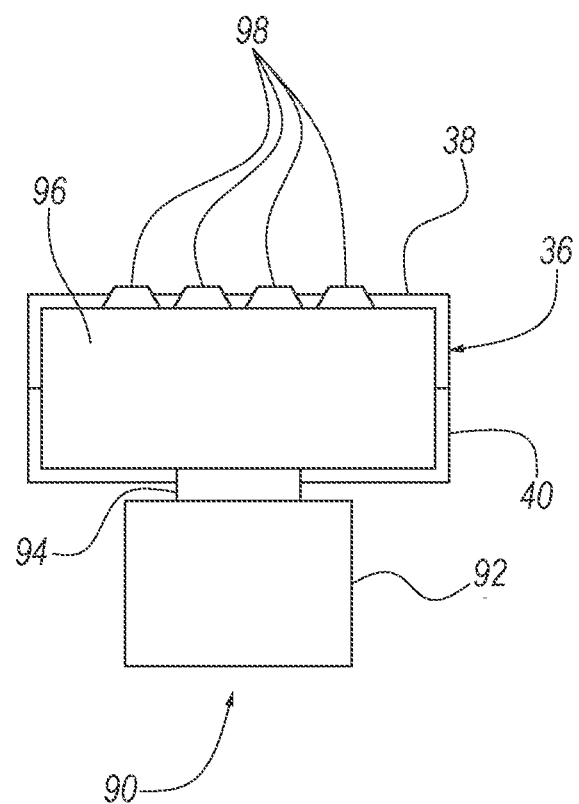
FIG. 7 is a diagram of an example air cleaning system of the vehicle.

A sensor assembly includes a base. A sensor housing is mounted to the base and is rotatable relative to the base about an axis. The sensor housing includes a top panel having an exterior surface. A plurality of fins are disposed on the exterior surface and are fixed relative to the sensor housing. The fins extend radially outward relative to the axis.

The top panel may be spaced from the base along the axis.

The top panel may extend circumferentially about the axis.

The sensor assembly may include a sensor inside the sensor housing. The exterior surface may face in an upward direction relative to the sensor.

The sensor assembly may include a motor arranged to rotate the sensor housing relative to the base.

Each of the plurality of fins may have a sinuous shape.

The plurality of fins may be arranged on a circle centered on the axis.

Each fin may include a first end disposed radially outwardly relative to the axis and a second end disposed radially outwardly from the first end.

The second ends of the plurality of fins may be spaced from each other circumferentially about the axis.

The second ends of the plurality of fins may be circumferentially offset about the axis from the respective first ends.

Each fin may include a first curved portion extending from the first end towards the second end, and a second curved portion extending from the second end towards the first end.

The first curved portion may curve from the first end to the second curved portion, and the second curved portion may curve from the first curved portion to the second end.

The second curved portion may curve in an opposite direction relative to the axis than the first curved portion.

The first and second curved portions may extend along the axis from the exterior surface. The second curved portion may extend farther along the axis from the exterior surface than the first curved portion extends along the axis from the exterior surface.

The fins may have a thermal conductivity equal to at least 15 watts per meter-Kelvin.

The fins and the top panel collectively may be a single piece unit.

The sensor assembly may include a gutter fixed relative to the sensor housing and elongated circumferentially around the sensor housing about the axis. The gutter may be spaced from the top panel along the axis.

The sensor housing may include a sensor window spaced from the top panel along the axis. The gutter may be disposed between the sensor window and the top panel along the axis.

The gutter may include a drain circumferentially spaced from the sensor window.

A sensor assembly 12 for a vehicle 10 includes a base 42 and a sensor housing 14 mounted to the base 42. The sensor housing 14 is rotatable relative to the base 42 about an axis A. The sensor housing 14 includes a top panel 16 having an exterior surface 18. A plurality of fins 24 are disposed on the exterior surface 18 and are fixed relative to the sensor housing 14. The fins 24 extend radially outward relative to the axis A.

The sensor assembly 12 provides a way to keep liquid off sensor windows 50. During operation, the sensor housing 14 rotates about the axis A, e.g., to obtain a 0° view of an area around the vehicle 10. As the sensor housing 14 rotates, the fins 24 direct liquid on the top panel 16 to fly off of the sensor housing 14, which can reduce the likelihood of liquid flowing down the sensor housing 14 and onto the sensor windows 50. Additionally, the gutter 22 may collect liquid that flows off the top panel 16 and may direct the liquid away from the sensor windows 50, as discussed further below.

With reference to FIG. 1, the vehicle 10 may be any passenger or commercial automobile such as a car, a truck, a sport utility vehicle, a crossover, a van, a minivan, a taxi, a bus, etc.

The vehicle 10 may be an autonomous vehicle. A vehicle computer can be programmed to operate the vehicle 10 independently of the intervention of a human driver, completely or to a lesser degree. The vehicle computer may be programmed to operate a propulsion, brake system, steering, and/or other vehicle systems based at least in part on data received from a sensor 26 described below, as well as other sensors 28. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 10 includes a body 30. The vehicle 10 may be of a unibody construction, in which a frame and the body 30 of the vehicle are a single component. The vehicle 10 may, alternatively, be of a body-on-frame construction, in which the frame supports the body 30 that is a separate component from the frame. The frame and body 30 may be formed of any suitable material, for example, steel, aluminum, etc.

The body 30 includes body panels 32 partially defining an exterior of the vehicle 10. The body panels 32 may present a class-A surface, e.g., a finished surface exposed to view by a customer and free of unaesthetic blemishes and defects. The body panels 32 include, e.g., a roof, etc.

A sensor apparatus 34 includes a housing 36 for the sensor assembly 12, including the sensor 26, and the other sensors 28. The housing 36 is attachable to the vehicle 10, e.g., to one of the body panels 32 of the vehicle 10, e.g., the roof. For example, the housing 36 may be shaped to be attachable to the roof, e.g., may have a shape matching a contour of the roof. The housing 36 may be attached to the roof, which can provide the sensor 26 and the other sensors 28 with an unobstructed field of view of an area around the vehicle 10. The housing 36 may be formed of, e.g., plastic or metal.

The housing 36 includes a housing upper piece 38 and a housing lower piece 40. The housing upper piece 38 and the housing lower piece 40 are shaped to fit together, with the housing upper piece 38 fitting on top of the housing lower piece 40. The housing upper piece 38 covers the housing lower piece 40. The housing upper piece 38 includes a central opening 44 that exposes the housing lower piece 40. The central opening 44 is round, e.g., has a circular or slightly elliptical shape. The housing upper piece 38 and the housing lower piece 40 are each monolithic. For the purposes of this disclosure, "monolithic" means a single-piece unit, i.e., a continuous piece of material without any fasteners, joints, welding, adhesives, etc., fixing multiple pieces to each other. For example, the housing upper piece 38 and the housing lower piece 40 may each be stamped or molded as a single piece.

The sensor assembly 12 is supported by and mounted to the housing 36, specifically the housing lower piece 40. The sensor assembly 12 includes a base 42 that is fixed relative to the housing 36. For example, the base 42 may be fixed to the housing lower piece 40, e.g., via fasteners, welding, adhesive, etc. The sensor assembly 12 can be disposed on top of the housing 36 at a highest point of the housing 36. For example, the sensor assembly 12 can extend through the central opening 44 of the housing upper piece 38.

The sensor 26 is supported by the base 42 and rotatable about the axis A relative to the base 42. For example, a motor, e.g., an electric motor, a servomotor, a brushless motor, etc., may rotate the sensor 26 about the axis A relative to the base 42 during operation of the vehicle 10. The sensor 26 may be designed to detect features of the outside world; for example, the sensor 26 may be a radar sensor, a scanning laser range finder, a light detection and ranging (LIDAR) device, or an image processing sensor such as a camera. In particular, the sensor 26 may be a LIDAR device, e.g., a scanning LIDAR device. A LIDAR device detects distances to objects by emitting laser pulses at a particular wavelength and measuring the time of flight for the pulse to travel to the object and back.

The sensor assembly 12 includes the sensor housing 14 fixed relative to the sensor 26. That is, the sensor housing 14 is rotatable relative to the base 42 about the axis A. The sensor 26 is disposed inside the sensor housing 14. The sensor housing 14 has a cylindrical shape and defines the axis A. The sensor housing 14 extends vertically upward along the axis A from the base 42. The sensor housing 14 includes a wall 46 having a top portion 48, sensor windows 50, and a bottom portion 52. The top portion 48 is disposed vertically above the sensor windows 50 along the axis A, and the bottom portion 52 is disposed vertically below the sensor windows 50 along the axis A. The top portion 48 and the bottom portion 52 are vertically spaced apart by a height of the sensor windows 50.

The sensor windows 50 are rectangular and are oriented substantially vertically. That is, the sensor windows 50 are elongated along the axis A. The sensor windows 50 are recessed radially inward from the wall 46 in window wells. Each window well extends along the axis A from a bottom edge 54 to a top edge 56. The bottom edge 54 contacts the bottom portion 52, and the top edge 56 contacts the top portion 48. The sensor windows 50 and the respective window wells are spaced from each other about the axis A. That is, the sensor windows 50 are spaced from each other circumferentially around the sensor housing 14.

As set forth above, the sensor housing 14 includes the top panel 16. The top panel 16 encloses the sensor housing 14 at the top portion 48. That is, the top panel 16 extends circumferentially about the axis A along the top portion 48 of the wall 46, and the top panel 16 extends radially outward from the axis A to the top portion 48 of the wall 46. The top panel 16 includes the exterior surface 18, as set forth above. The exterior surface 18 faces up, i.e., in a vehicle-upward direction, i.e., axially, relative to the axis A. That is, the exterior surface 18 faces away from the sensor 26. The top edges 56 are spaced from the exterior surface 18 along the axis A. That is, the sensor windows 50 are below the exterior surface 18 of the top panel 16.

The sensor assembly 12 may include any suitable number of fins 24, e.g., two or more, disposed on the exterior surface 18. The fins 24 extend upward from the exterior surface 18 along the axis A. The fins 24 are disposed circumferentially about the axis A. The fins 24 may be arranged in an annular pattern, i.e., the spacing between the fins 24 may be repeatable about the axis A. As another example, the spacing between the fins 24 may be random, i.e., non-repeatable. The fins 24 may be positioned such that the fins 24 direct liquid outwardly from the axis A as the sensor housing 14 rotates about the axis A.

The fins 24 extend radially outwardly from a circle extending around the axis A. Each fin 24 includes a first end 58 and a second end 60 spaced from the first end 58. The first ends 58 of the fins 24 may be disposed radially outwardly relative to the axis A. That is, the first ends 58 may be spaced from the axis A. The first ends 58 may be spaced from the axis A by a same or different amount than one another. For example, a radius from the axis A to a first end 58 may be the same for each fin 24. That is, the plurality of fins 24 may be arranged on a circle centered on the axis A. As another example, the radius from the axis A to a first end 58 may be different for some fins 24. In other words, some first ends 58 may be disposed radially closer to the axis A than other first ends 58. Alternatively, the first ends 58 may be disposed at the axis A. In such an example, the first ends 58 abut each other.

The second ends 60 are disposed radially outwardly from the respective first ends 58. For example, the second ends 60 may be disposed adjacent to the wall 46, i.e., an edge of the exterior surface 18. That is, the second ends 60 are disposed between the respective first ends 58 and the wall 46, i.e., the edge of the exterior surface 18. The second ends 60 are spaced from each other circumferentially about the axis A. That is, a radius from the axis A to a second end 60 may be the same for each fin 24. Each second end 60 may be circumferentially offset about the axis A from the respective first end 58.

The fins 24 may include a first curved portion 62 and a second curved portion 64. The first curved portion 62 may extend from the first end 58 towards the second curved portion 64, and the second curved portion 64 may extend from the second end 60 towards the first curved portion 62. For example, the first curved portion 62 may curve from the first end 58 to the second curved portion 64, and the second curved portion 64 may curve from the first curved portion 62 to the second end 60. The first and second curved portions 62, 64 are curved in opposite directions relative to the axis A. That is, the fins 24 may have a sinuous shape, i.e., serpentine, wavy, etc., i.e., a repeating pattern of curves in opposite directions. The first and second curved portions 62, 64 may extend a same or different amount upward from the exterior surface 18 along the axis A. For example, the second curved portion 64 may extend farther from the exterior surface 18 along the axis A than the first curved portion 62 extends from the exterior surface 18 along the axis A.

The fins 24 and the top panel 16 may collectively be monolithic. In other words, the fins 24 and the top panel 16 may collectively be a single-piece unit, i.e., a continuous piece of material without any fasteners, joints, welding, adhesives, etc. For example, the fins 24 and the top panel 16 may be molded as a single piece. As another example, the fins 24 and the top panel 16 may be separately formed and subsequently attached together by, e.g., fasteners, welding, etc.

The fins 24 may be made of any suitable material. For example, the fins 24 may be plastic, e.g., polyurethane, and poly-vinyl-chloride, polyethylene, etc. As another example, the fins 24 may be made of any suitable material for conducting heat, e.g., metal. In such an example, the fins 24 may conduct heat away from the sensor housing 14 during operation of the sensor 26. For example, the fins 24 may be thermally conductive, i.e., have a high thermal conductivity, e.g., a thermal conductivity equal to at least 15 watts per meter-Kelvin (W/(m K)), e.g., greater than W/(m K), at 25° C.

A gutter 22 is fixed to the sensor housing 14 and extends around the sensor housing 14 about the axis A. The gutter 22 is spaced from the exterior surface 18 of the top panel 16 along the axis A. The gutter 22 is positioned between the sensor windows 50 and the top portion 48 of the wall 46. The gutter 22 is fixed relative to the sensor housing 14. The gutter 22 extends circumferentially around the top portion 48 of the wall 46.

The gutter 22 includes an inner surface 66. The inner surface 66 faces radially inward and extends circumferentially around the axis A. The gutter 22 contacts the top portion 48 continuously along a circumference via the inner surface 66. The inner surface 66 has a cylindrical shape with a diameter approximately equal to the diameter of the top portion 48. For example, the diameter of the inner surface 66 when the gutter 22 is unstressed can be slightly smaller than the diameter of the top portion 48, and the gutter 22 can be attached to the top portion 48 with a press fit. For another example, the diameter of the inner surface 66 can be equal to or slightly larger than the diameter of the top portion 48, and the gutter 22 can be attached to the top portion 48, e.g., via adhesive, fasteners, welding, etc.

The gutter 22 includes a topside 68 and an underside 70. The gutter 22 has a constant cross-section that is elongated circumferentially around the axis A, e.g., elongated circumferentially more than 270° around the axis A. The gutter 22 may include a drain 72 (described below), and the constant cross-section of the gutter 22 may be elongated circumferentially from the drain 72 to the drain 72. Alternatively, the gutter 22 may lack the drain 72, and the constant cross-section of the gutter 22 may be elongated for 0° about the axis A. The cross-section of the gutter 22 includes the inner surface 66, the topside 68, and the underside 70. The topside 68 is the portion of the cross-section of the gutter 22 that is projectable straight upward, i.e., is visible from a point of view looking straight downward at the gutter 22. The underside 70 is the portion of the cross-section of the gutter 22 that is projectable straight downward, i.e., is visible from a point of view looking straight upward at the gutter 22. The topside 68 and the underside 70 are disposed radially outward from the sensor housing 14.

The underside 70 includes a first groove 74. The first groove 74 has a cross-section that is elongated circumferentially around the axis A, e.g., elongated circumferentially more than 270° around the axis A, e.g., elongated circumferentially from the drain 72 to the drain 72. The cross-section of the first groove 74 curves from a lower end 76 upwardly and outwardly to an upper end 78. The lower end 76 has a tangent line oriented parallel to the axis A, and the upper end 78 has a tangent line oriented diagonally outward and upward relative to the axis A. The tangent line of the upper end 78 of the first groove 74 forms an upward-facing angle $\theta_1$ with the axis A. The upward-facing angle $\theta_1$ may be less than 60°, e.g., approximately 50°. The diameter of the first groove 74 at the upper end 78 end of the cross-section is greater than the diameter of the first groove 74 at the lower end 76 of the cross-section. The diameter of the first groove 74 at the lower end 76 of the cross-section is at least as great as the diameter of the sensor housing 14.

The underside 70 of the gutter 22 includes a second groove 80 extending upward from the first groove 74. The second groove 80 has a cross-section that is elongated circumferentially around the axis A, e.g., elongated circumferentially more than 270° around the axis A, e.g., elongated circumferentially from the drain 72 to the drain 72. The cross-section of the second groove 80 curves from a lower end 82 upwardly and outwardly to an upper end 84. A tangent line of the upper end 84 of the second groove 80 forms an upward-facing angle $\theta_2$ with the axis A. The upward-facing angle $\theta_2$ may be greater than 45°, e.g., approximately 65°. The diameter of the second groove 80 at the upper end 84 of the cross-section is greater than the diameter of the second groove 80 at the lower end 82 of the cross-section. The diameter of the second groove 80 at the lower end 82 of the cross-section is equal to the diameter of the first groove 74 at the upper end 78 of the cross-section of the first groove 74.

The topside 68 of the gutter 22 includes a channel 86. The channel 86 is elongated circumferentially around the axis A, e.g., elongated circumferentially more than 270° around the axis A, e.g., elongated circumferentially from the drain 72 to the drain 72. The channel 86 includes a gutter wall 88 at least partially constituting the channel 86, and the gutter wall 88 has a cross-section elongated circumferentially around the axis A and extending diagonally outward and upward relative to the axis A. The gutter wall 88 forms an upward-facing angle φ with the axis A. The upward-facing angle φ may be greater than 45°, e.g., approximately 65°.

The gutter 22 may include the drain 72. The drain 72 extends radially outward relative to the axis A from the channel 86. The drain 72 is lower than an upper height of the channel 86, i.e., lower than a top of the gutter wall 88. The drain 72 can be positioned between the sensor windows 50. That is, gutter 22 can collect liquid that flows off of the top panel 16, and can direct the liquid away from the sensor windows 50 via the drain 72.

An air cleaning system 90 includes a compressor 92, a filter 94, a chamber 96, and air nozzles 98. The compressor 92, the filter 94, and the air nozzles 98 are liquidly connected to each other (i.e., liquid can flow from one to the other) in sequence through the chamber 96.

The compressor 92 increases the pressure of a gas by, e.g., forcing additional gas into a constant volume. The compressor 92 may be any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The filter 94 removes solid particulates such as dust, pollen, mold, dust, and bacteria from air flowing through the filter 94. The filter 94 may be any suitable type of filter, e.g., paper, foam, cotton, stainless steel, oil bath, etc.

The housing upper piece 38 and the housing lower piece 40 form the chamber 96 by enclosing a space between the housing upper piece 38 and the housing lower piece 40. The compressor 92 can be positioned to pressurize the chamber 96, i.e., positioned to draw in air from outside the housing and output air into the chamber 96.

The air nozzles 98 are positioned to receive pressurized air from the chamber 96 and discharge that air across the sensor windows 50. The air nozzles 98 are oriented to discharge parallel to the axis A across the sensor windows 50 from below the sensor windows 50. The air nozzles 98 may be formed of the base 42 of the sensor housing 14 and of air-nozzle surfaces 100. The air-nozzle surfaces 100 may be curved plates of substantially constant thickness. Each air-nozzle surface 100 may extend vertically parallel to the axis A and circumferentially around the axis A at a substantially constant radius from the axis A. In such an example, pressurized air from the chamber 96 may be directed vertically upward through a gap 102 formed between the base 42 and the air-nozzle surfaces 100.

In operation, liquid may land on top of the sensor housing 14. The liquid may be water, e.g., precipitation such as rain, or may be washer liquid from, e.g., a cleaning system of the vehicle 10. As the sensor housing 14 rotates about the axis A, the fins 24 may direct the liquid to fly off of the top panel 16 and outwardly relative to the axis A. That is, the rotation of the fins 24 may exert a force on the liquid that propels the liquid away from the sensor windows 50. Liquid that flows off of the top panel 16 is caught by the gutter 22 as the liquid flows off of the top panel 16, and the channel 86 carries the liquid to the drain 72, where the liquid exits away from the sensor assembly 12 without contacting the sensor windows 50.

In operation, the sensor 26 generates heat. Much of the heat generated by the sensor 26 is transmitted to the top panel 16. The top panel 16 radiates heat outward through the fins 24. The fins 24 can transfer heat to the environment as the sensor housing 14 rotates, which allows the heat to exit the sensor assembly 12. Additionally, the fins 24 can transfer heat to liquid that is on the top panel 16, which allows the heat to exit the sensor assembly 12 along with the liquid. The flowing liquid increases the rate of heat transfer through the fins 24 compared with not having a replenishing supply of liquid to transfer heat to.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A sensor assembly, comprising:
a base;
a sensor housing mounted to the base and rotatable relative to the base about an axis, the sensor housing including a top panel spaced from the base along the axis and having an exterior surface and a sensor window disposed between the base and the top panel;
a plurality of fins disposed on the exterior surface and fixed relative to the sensor housing, the fins extending radially outward relative to the axis and configured to direct fluid off of the exterior surface; and
a gutter fixed relative to the sensor housing and configured to direct the fluid away from the sensor window.

2. The sensor assembly of claim 1, wherein the fins and the top panel collectively are a single piece unit.

3. The sensor assembly of claim 1, wherein the top panel extends circumferentially about the axis.

4. The sensor assembly of claim 1, further comprising a sensor inside the sensor housing, wherein the exterior surface faces in an upward direction relative to the sensor.

5. The sensor assembly of claim 1, further comprising a motor arranged to rotate the sensor housing relative to the base.

6. The sensor assembly of claim 1, wherein each of the plurality of fins has a sinuous shape.

7. The sensor assembly of claim 1, wherein the plurality of fins are spaced from each other circumferentially about the axis.

8. The sensor assembly of claim 7, wherein the plurality of fins are arranged on a circle centered on the axis.

9. The sensor assembly of claim 1, wherein each fin includes a first end disposed radially outwardly relative to the axis and a second end disposed radially outwardly from the first end.

10. The sensor assembly of claim 9, wherein the second ends of the plurality of fins are spaced from each other circumferentially about the axis.

11. The sensor assembly of claim 9, wherein the second ends of the plurality of fins are arranged on different radial lines extending from the axis than the respective first ends.

12. The sensor assembly of claim 9, wherein each fin includes a first curved portion extending from the first end towards the second end, and a second curved portion extending from the second end towards the first end.

13. The sensor assembly of claim 12, wherein the first curved portion curves from the first end to the second curved portion, and the second curved portion curves from the first curved portion to the second end.

14. The sensor assembly of claim 12, wherein the second curved portion curves in an opposite direction relative to the axis than the first curved portion.

15. The sensor assembly of claim 12, wherein the first and second curved portions include respective heights determined along the axis from the exterior surface, the height of the second curved portion being greater than the height of the first curved portion.

16. The sensor assembly of claim 1, wherein the fins are further configured to conduct heat away from the sensor housing.

17. The sensor assembly of claim 16, wherein the fins have a thermal conductivity equal to at least 15 watts per meter-Kelvin.

18. The sensor assembly of claim 1, wherein the gutter is elongated circumferentially around the sensor housing about the axis and is spaced from the top panel along the axis.

19. The sensor assembly of claim 1, wherein the gutter is disposed between the sensor window and the top panel along the axis.

20. The sensor assembly of claim 19, wherein the gutter includes a drain circumferentially spaced from the sensor window.

\* \* \* \* \*